(12) United States Patent
Barrow

(10) Patent No.: US 7,278,003 B1
(45) Date of Patent: Oct. 2, 2007

(54) DATA STORAGE SYSTEM HAVING ACCURATE AND COHERENT TIME INFORMATION

(75) Inventor: Jonathan J. Barrow, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 418 days.

(21) Appl. No.: 10/812,456

(22) Filed: Mar. 30, 2004

(51) Int. Cl.
*G06F 13/00* (2006.01)

(52) U.S. Cl. .................. 711/167; 713/400; 713/401

(58) Field of Classification Search ............... None

See application file for complete search history.

(56) References Cited

U.S. PATENT DOCUMENTS

| | | | |
|---|---|---|---|
| 6,873,573 B2* | 3/2005 | Pikula et al. | 368/10 |
| 2003/0140192 A1* | 7/2003 | Thibault et al. | 710/305 |
| 2005/0124390 A1* | 6/2005 | Hansson et al. | 455/575.1 |

* cited by examiner

Primary Examiner—Jasmine Song

(57) ABSTRACT

A data storage system for transferring data between a host computer/server and a bank of disk drives through a system interface. The system interface includes a plurality of directors. One portion of the directors is coupled to the host computer/server and another portion of the directors is coupled to the bank of disk drives. The directors control a flow of data between the host computer/server and the bank of disk drives. Each one of the directors has a time element. A time manager provides accurate time information to the time elements. The time elements determine, from the time information fed thereto, and measured time delays, global machine time information for the one of the directors having such time element. The time system is self calibrating.

10 Claims, 4 Drawing Sheets

DATA STORAGE SYSTEM HAVING ACCURATE AND COHERENT TIME INFORMATION

INCORPORATION BY REFERENCE

This application incorporates by reference, in their entirety, the following co-pending patent applications all assigned to the same assignee as the present invention:

| INVENTORS | FILING DATE | SER. NO. | TITLE |
|---|---|---|---|
| Yuval Ofek et al. | Mar. 31, 2000 | 09/540,828 | Data Storage System Having Separate Data Transfer Section And Message Network |
| Paul C. Wilson et al. | Jun. 29, 2000 | 09/606,730 | Data Storage System Having Point-To-Point Configuration |
| John K. Walton et al. | Jan. 22, 2002 | 10/054,241 | Data Storage System (Divisional of 09/223,519 filed Dec. 30, 1998) |
| Christopher S. MacLellan et al. | Dec. 21, 2000 | 09/745,859 | Data Storage System Having Plural Fault Domains |
| John K. Walton | May 17, 2001 | 09/859,659 | Data Storage System Having No-Operation Command |
| Ofer Porat et al | Mar. 31, 2003 | 10/403,262 | Data Storage System |

TECHNICAL FIELD

This invention relates generally to data storage systems, and more particularly to data storage systems utilizing multiple processing units having improved accuracy and coherent time status information presented to the constituent processing units

BACKGROUND

As is known in the art, large host computers (also referred to as application servers collectively referred to herein as "host computer/servers") require large capacity data storage systems. These large host computer/servers generally include data processors which perform many operations on data transported to and from the host computer/server through peripherals including the data storage system.

One type of data storage system is a magnetic disks storage system. Here many disk drives are organized into separate sets of disk banks, and these banks are controlled and managed by "back-end" disk controllers (or directors). Also a set of "front-end" (directors) are provided by the storage system and are used by host computer/servers for physical attachment to the storage system. That is, data is stored in and retrieved from the bank of disk drives in such a way that the host computer/server merely thinks it is operating with its own local disk drive. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. patent, the storage system may also include, in addition to the host computer/server controllers, (i.e., processors or directors) and disk controllers (sometimes also referred to as processors or directors), addressable cache memories. The cache memory is a semiconductor memory and is provided to rapidly store data from the host computer/server before storage in the disk drives, and, on the other hand, store data from the disk drives prior to being sent to the host computer/server. The cache memory being a semiconductor memory, as distinguished from a magnetic memory as in the case of the disk drives, is much faster than the disk drives in reading and writing data.

The host computer/server controllers, disk controllers and cache memory are interconnected through a backplane printed circuit board (i.e., backplane). More particularly, disk controllers are mounted on disk controller printed circuit boards. The host computer/server controllers are mounted on host computer/server controller printed circuit boards. And, cache memories are mounted on cache memory printed circuit boards. The disk directors, host computer/server directors, and cache memory printed circuit boards plug into the backplane.

As is also known in the art, it is desirable to provide accurate time information to each of the processors in the storage system. At present, crystal oscillators—one used upon each of the directors for purposes of basic operation and time keeping—are separate from one other. As such time status information remains incoherent between processing elements at the storage system's perspective. Time offset, skew, and drift can only be corrected using statistical methods by the processor elements. As will be discussed a mechanism is presented here to replace the statistical method with a deterministic one. This is especially useful for purposes of aggregating the transport of data across multiple physical I/O channels, referred to in the art as real-time parallel I/O.

Reference is also made to "Network Time Protocol (Version 3) Specification, Implementation and Analysis", Network Working Group, David L. Mills University of Delaware March 1992.

SUMMARY

In accordance with the present invention, a time system is provided featuring at least one time manager and also having a plurality of time elements. The time manager is connected serially to the time elements. The time manager provides control and management to the sub-ordinate time elements. As such, the time manager provides accurate initial time information as a seed to the connected time elements. The time elements have the capability to determine physical distance from the time manager and adjacent time elements. With physical distance determined and from initial time information seed fed thereto, global machine time as a function of time delay from the time manager to such one of the time elements is now coherent i.e., time offset, drift, and skew are essentially eliminated. Hence, the time elements are self calibrating.

In one embodiment, the initial time information seed is passed from the time manager to the time elements in series.

In accordance with another feature of the invention, a data storage system is provided for transferring data between a host computer/server and a bank of disk drives through a system interface. The system interface includes a plurality of directors. One portion of the directors is coupled to the host computer/server and another portion of the directors is coupled to the bank of disk drives. The directors control a flow of data between the host computer/server and the bank of disk drives. Each one of the directors has a time element. A time manager provides accurate time information to the time elements. The time elements determine, from the time information fed thereto, global machine time information for the one of the directors having such time element.

In one embodiment, a data storage system is provided for transferring data between a host computer/server and a bank of disk drives through a system interface. The system interface includes a plurality of directors. One portion of the directors is coupled to the host computer/server and another portion of the directors is coupled to the bank of disk drives. The directors control a flow of data between the host computer/server and the bank of disk drives. Each one of the directors has a time element. A time manager is connected to the time elements. The time manager provides accurate time information to the connected time elements. The time elements fed thereto derive global machine time status information for the one of the directors having such time element. Each one of the time elements determines the global machine time as a function of time delay and initial seed time data from the time manager to such one of the time elements.

DESCRIPTION OF DRAWINGS

These and other features of the invention will become more readily apparent from the following detailed description when read together with the accompanying drawings, in which.

Like reference symbols in the various drawings indicate like elements.

DETAILED DESCRIPTION

Figure 1:
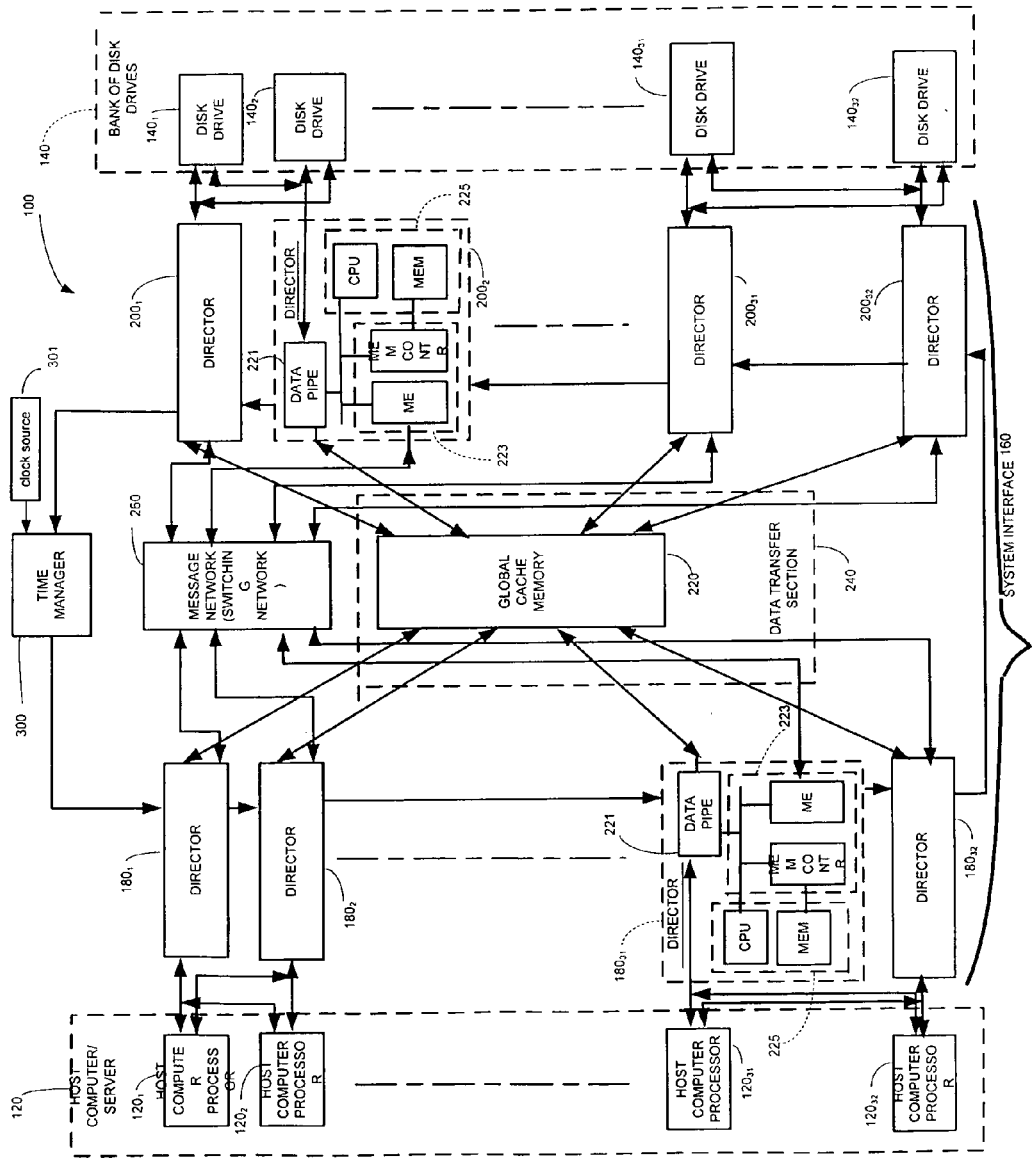
FIG. 1 is a block diagram of a data storage system according to the invention.

Referring now to FIG. 1, a data storage system 100 is shown for transferring data between a host computer/server 120 and a bank of disk drives 140 through a system interface 100. The system interface 100 includes: a plurality of, here 32 front-end directors $180_1$-$180_{32}$ coupled to the host computer/server 120 via ports $123_1$-$123_{32}$; a plurality of back-end directors $200_1$-$200_{32}$ coupled to the bank of disk drives 140; a data transfer section 240, having a global cache memory 220, coupled to the plurality of front-end directors $180_1$-$180_{16}$ and the back-end directors $200_1$-$200_{16}$; and a messaging network 260, operative independently of the data transfer section 240, coupled to the plurality of front-end directors $180_1$-$180_{32}$ and the plurality of back-end directors $200_1$-$200_{32}$, as shown. The front-end and back-end directors $180_1$-$180_{32}$, $200_1$-$200_{32}$ are functionally similar and include a microprocessor (μP) 225 (i.e., a central processing unit (CPU) and RAM), a message engine/CPU controller 221 and a data pipe 221, described in detail in the co-pending patent applications referred to above. Suffice it to say here, however, that the front-end and back-end directors $180_1$-$180_{32}$, $200_1$-$200_{32}$ control data transfer between the host computer/server 120 and the bank of disk drives 140 in response to messages passing between the directors $180_1$-$180_{32}$, $200_1$-$200_{32}$ through the messaging network 260. The messages facilitate the data transfer between host computer/server 120 and the bank of disk drives 140 with such data passing through the global cache memory 220 via the data transfer section 240.

It is noted that in the host computer 120, each one of the host computer processors $121_1$-$121_{32}$ is coupled to here a pair (but not limited to a pair) of the front-end directors $180_1$-$180_{32}$, to provide redundancy in the event of a failure in one of the front end-directors $181_1$-$181_{32}$ coupled thereto. Likewise, the bank of disk drives 140 has a plurality of, here 32, disk drives $141_1$-$141_{32}$, each disk drive $141_1$-$141_{32}$ being coupled to here a pair (but not limited to a pair) of the back-end directors $200_1$-$200_{32}$, to provide redundancy in the event of a failure in one of the back-end directors $200_1$-$200_{32}$ coupled thereto). Thus, front-end director pairs $180_1$, $180_2$; . . . $180_{31}$, $180_{32}$ are coupled to processor pairs $121_1$, $121_2$; . . . $121_{31}$, $121_{32}$, respectively, as shown. Likewise, back-end director pairs $200_1$, $200_2$; . . . $200_{31}$, $200_{32}$ are coupled to disk drive pairs $141_1$, $141_2$; . . . $141_{31}$, $141_{32}$, respectively, as shown.

Figure 2:
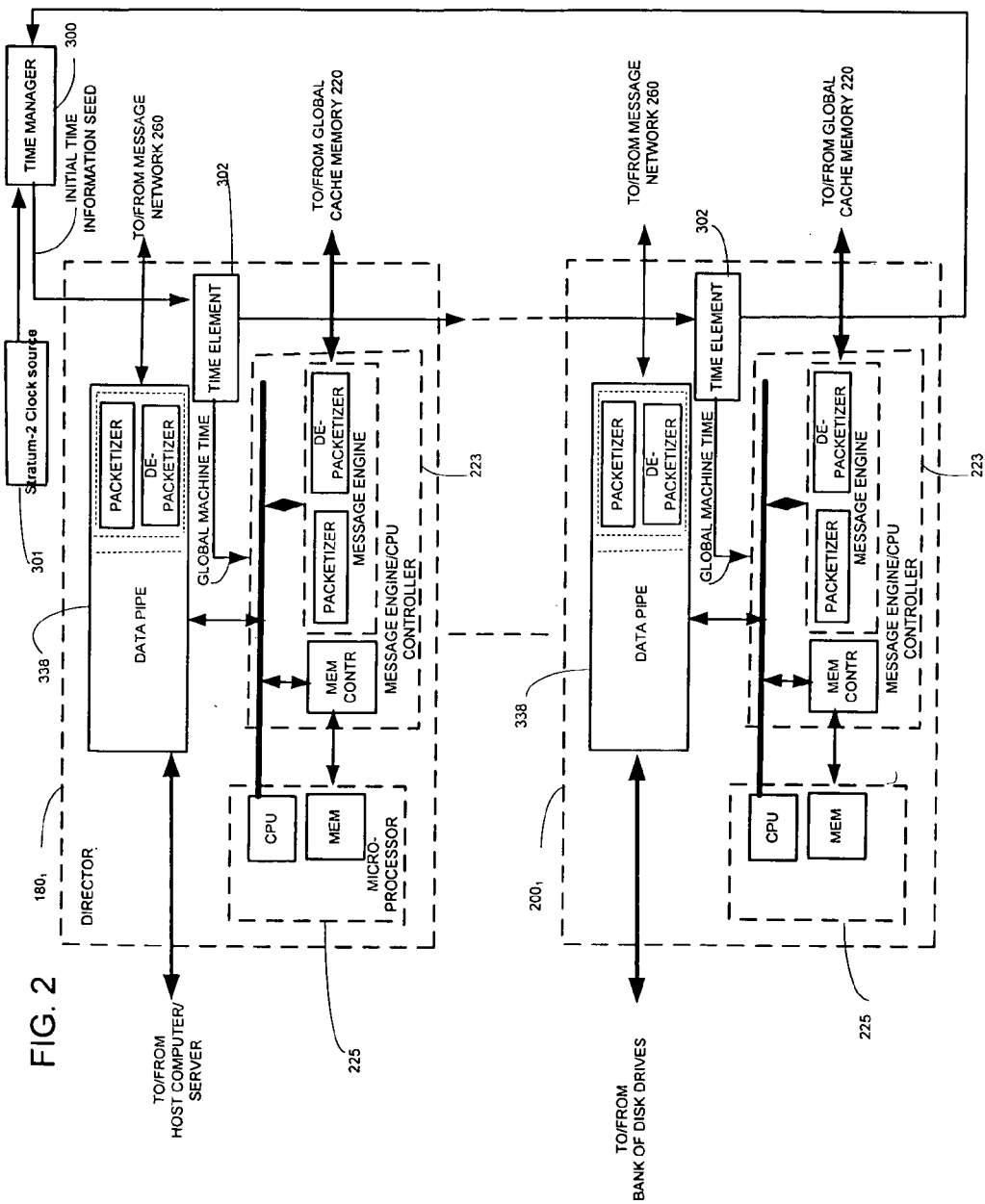
FIG. 2 is a block diagram showing the arrangement of time elements and a time manager used in the data storage system of FIG. 1.
Figure 3:
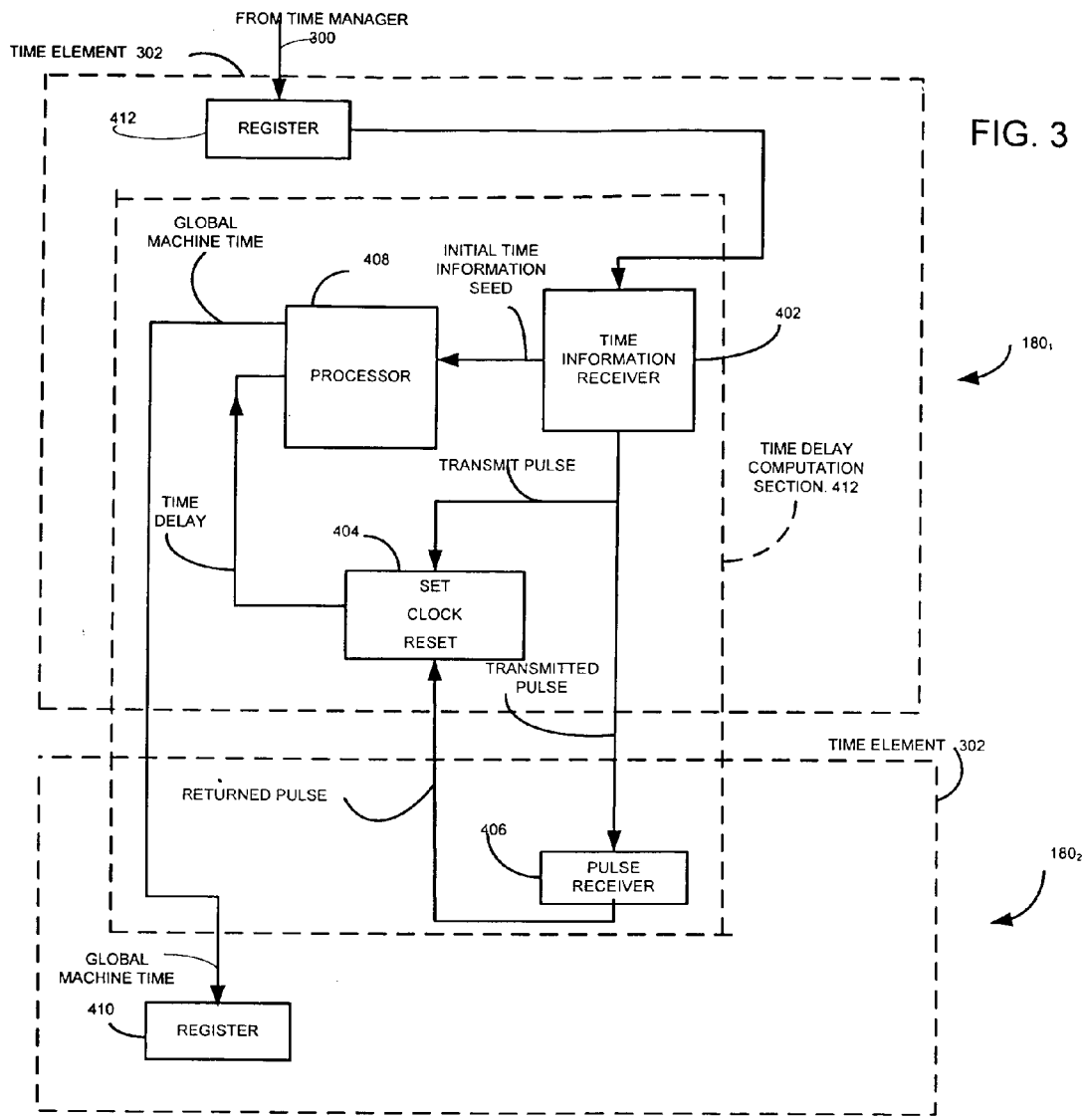
FIG. 3 is a block diagram showing a time delay computation section used for a pair of connected ones of the a time manager and a time element connected serially to the time manager used in the system of FIG. 2.

The system interface 100 also includes a time manager 300, to be described in more detail in FIG. 2. The time manager 300 receives accurate time status using public stratum-2 clock sources 301, for example, Global Positioning System, UHF (Band 9), or Geostationary (GOES) satellites. And provides this data as a seed, wherein the time elements then perform logical operations to correct, (compensate). The resulting time system ensures that each one of the directors $180_1$-$180_{32}$, $200_1$-$200_{32}$ has accurate and coherent time status information herein referred to as global machine time.

Referring now also to FIG. 2, an exemplary one of the front-end directors, here director $180_1$ and an exemplary one of the back-end directors, here director $200_1$ are shown in more detail. Each one of the directors $180_1$-$180_{32}$, $200_1$-$200_{32}$ includes a time element 302. As noted above, the time manager 300 provides accurate initial time status at the interface 100. The time elements 302 of the plurality of directors $180_1$-$180_{32}$, $200_1$-$200_{32}$ are serially connected together as shown in FIG. 2.

The time manager 300 is here serially connected to a first one of the serially connected time elements, here to director $180_1$, as shown. The first one of the serially connected time elements 302 determines, from the time information fed thereto by the time manager, global machine time information (i.e., coherent time of the storage system) for the one of the directors (here, in this example, director $180_1$) having such time element 302. Because the directors $180_1$-$180_{32}$, $200_1$-$200_{32}$ have a fixed relative position to one another and to the time manager 300, the time delay it takes for the time information from the time manager 300 to pass from the time manager 300 to director $180_1$ is a constant time delay.

Figure 4:
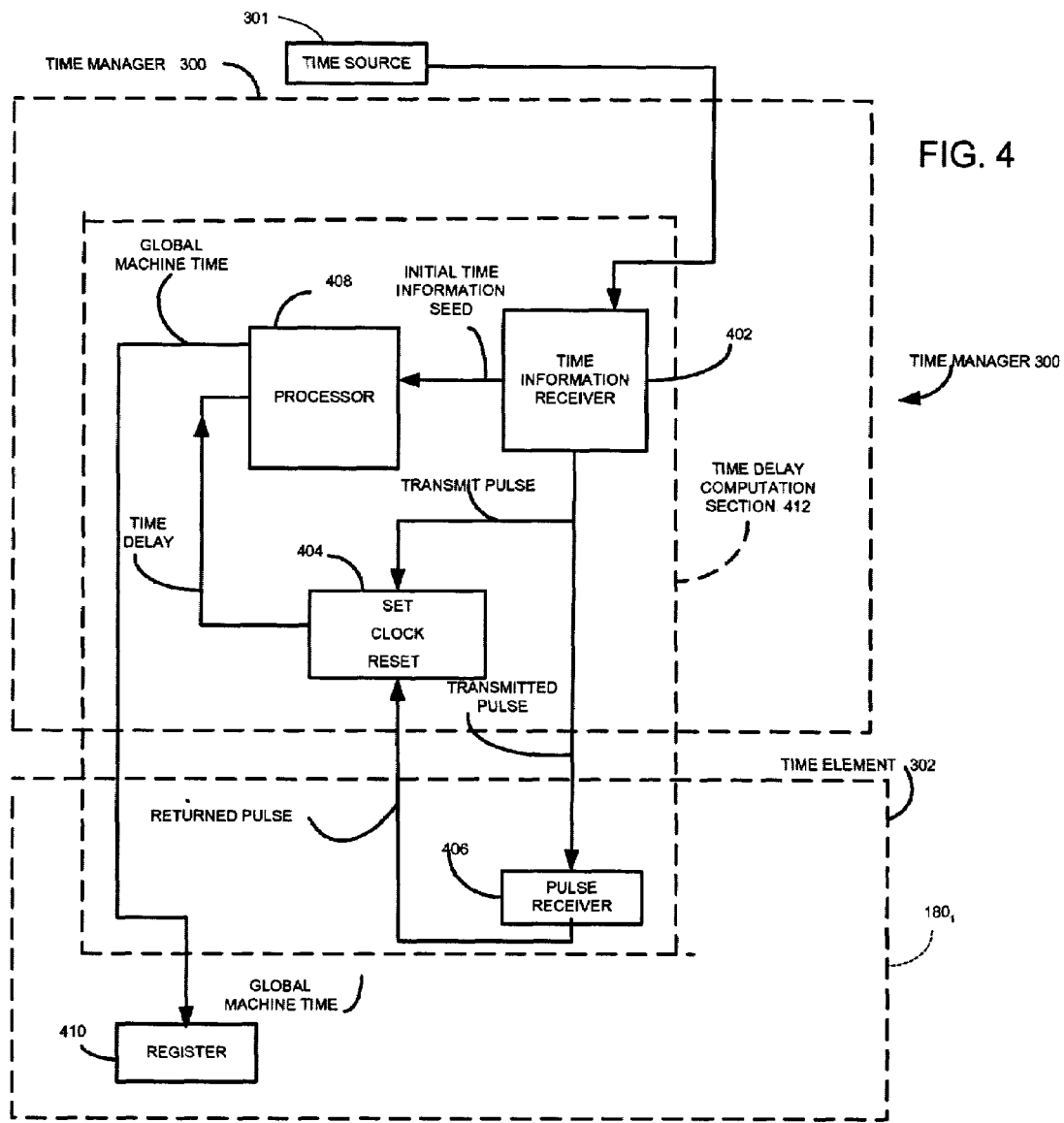
FIG. 4 is a block diagram showing a time delay computation section used for a pair of successively serially connected time elements of FIG. 2.

It should be noted that here, in this example, the time elements 302 of the directors $180_1$-$180_{32}$, $200_1$-$200_{32}$ have the capability of measuring the time delay between itself and next neighbor, either the time manager or another time element Thus, referring to FIG. 4, the time manager 300 is shown connected between the time source 301 and the one of the time elements 302 of the director directly connected to the time manager 300; thus, here to the time element in time manager 300. The initial time information seed provided by the source 301 is fed to a time information receiver 402 included in the time manager 302. When such receiver 402 receives the initial time information seed, such receiver 402 generates a transmit pulse. The transmit pulse is sent to the set input of a clock 404 and also to a pulse receiver 406 of the next successively serially connected director $180_1$, as shown. The pulse receiver 406, in response to detection of the transmitted pulse, sends a returned pulse to the reset input of the clock 404. The contents of the counter 404 now represents the time delay between the time manager 300 and the successively serially director $180_1$. The measured time delay is sent to the processor 408. Such processor 308 therefore determines the global machine time for director $180_1$ and such computed global machine time is stored in register 410 of director $180_1$.

Thus, the elements 402, 404, 406 and 408 provide a time computation section 412, as shown.

The global machine time determined for the time element 302 and stored in register 410-is fed to a time information receiver 402 of the time element 302 of next successively connector director, here director $180_2$ as sown in FIG. 4.

Referring to FIG. 4, the process repeats to determine the time delay between director 1801 and the next successively serially connected director, here director $180_2$.

Thus, referring to FIG. 4, the time information from the register 410 of director $180_1$ is fed to a time information receiver 402 of director $180_1$. When such receiver 402 receives the time information, such receiver 402 generates a transmit pulse. The transmit pulse is sent to the set input of a clock 404 and also to a pulse receiver 406 of the next successively serially connected director $180_2$, as shown. The pulse receiver 406, in response to detection of the transmitted pulse, sends a returned pulse to the reset input of the clock 404. The contents of the counter 404 now represents the time delay between successively serially connected time elements 302 of directors $180_1$ and $180_2$. The measured time delay is sent to the processor 408. Such processor 308 therefore determines the global machine time for director $180_2$ and such computed global machine time is stored in register 410 of director $180_2$, and so forth in like manner for all the other remaining directors.

Thus, the time element 302 is able to provide global machine time information for the one of the directors having such one of the time elements, here director $180_1$. Here, the global machine time information is provided to the message engine/CPU controller 223 and may be stored for further reference, as for example in case of a failure of the interface 100.

The time information then passes sequentially to directors $108_2$ through directors $180_{32}$, in this example, and then to directors $200_{32}$ to director $200_1$, as shown in FIG. 1. As with the time element 302 described above in connection with director $180_1$, the time element 302 (FIG. 2) determines, from the time information fed thereto by the time manager 302, global machine time information (i.e., the time of the storage system) for the one of the having such time element 302. The time element 302 calculates from the predetermined time delay it takes for the time information to pass from the time manager 300 to a particular director and the predetermined time element 302 calculation the time element 302 at each one of the time elements 320 is able to provide global machine time information for the one of the directors having such one of the time elements.

It should be noted that the time information at the last one of the directors, here director $200_1$ is fed back to the time manager 300. The total time delay from the time manager 300 back to the time manager 300 after passing through the serially connected directors $180_1$-$180_{32}$, $200_1$-$200_{32}$ is a predetermined time delay. Thus, the time manager 300 checks the time information it receives from the last director in the chain or loop, here director $200_1$ against the time information it sent to the first director in the chain, here director $180_1$ to determine whether they are consistent with the delay expected. If not, an error is detected and reported.

A number of embodiments of the invention have been described. Nevertheless, it will be understood that various modifications may be made without departing from the spirit and scope of the invention. Accordingly, other embodiments are within the scope of the following claims.

What is claimed is:

1. A system, comprising:
   a plurality of time elements;
   a time manager connected to the time elements;
   wherein the time manager provides an accurate initial time information seed to the connected time elements;
   wherein the time elements derive, from the initial time information seed fed thereto and previously calculated delay information from the time manager to the time elements, a global machine time, such global machine time being a function of the calculated time delay from the time manager and the initial time information seed; and
   wherein each one of the time elements determines the global machine time as a function of a calculation time taken by such time element to make the determination.

2. The system recited in claim 1 wherein the initial time information seed is passed from the time manager to the time elements in series.

3. A data storage system for transferring data between a host computer/server and a bank of disk drives through a system interface, such system interface comprising:
   a plurality of directors, one portion thereof being coupled to the host computer/server and another portion thereof being coupled to the bank of disk drives, such directors controlling a flow of data between the host computer/server and the bank of disk drives, each one of the directors having a time element;
   a time manager connected to the time elements;
   wherein the time manager provides accurate time information to the connected time elements;
   wherein the time elements determine, from the time information fed thereto, global machine time for the one of the directors having such time element; and
   wherein each one of the time elements determines the global machine time as a function of time delay from the time manager to such one of the time elements; and
   wherein each one of the time elements determines the global machine time as a calculation of initial time provided by the time manager and the previously measured delay of information transport, and time taken by such time element to make the determination.

4. The system recited in claim 3 wherein the time information is passed from the time manager to the time elements in series.

5. A data storage system for transferring data between a host computer/server and a bank of disk drives through a system interface, such system interface comprising:
   a plurality of directors, one portion thereof being coupled to the host computer/server and another portion thereof being coupled to the bank of disk drives, such directors controlling a flow of data between the host computer/server and the bank of disk drives, each one of the directors having a time elements, the time elements of the plurality of directors being serially connected together;

a time manager serially connected to a first one of the serially connected time elements;

wherein the time manager provides accurate time information to a first one of the serially connected time elements;

wherein the first one of the serially connected time elements determines, from the time information fed thereto, global machine time for the one of the directors having such time element;

wherein the time information is passed to the serially connected time elements, each one thereof providing the global machine time for the one of the directors having such one of the time elements; and wherein each one of the time elements determines the global machine time as a function of time delay from a preceding one of the serially connected time elements to such one of the time elements.

6. The system recited in claim 5 wherein each one of the time elements determines the global machine time as a function of a calculation time taken by such time element to make the determination.

7. The system recited in claim 5 wherein the time delay is a predetermined time delay.

8. The system recited in claim 6 wherein the calculation time is a predetermined time.

9. The system recited in claim 8 wherein the time information is passed back to the time manager from one of the time elements.

10. The system recited in claim 8 wherein the time information is passed back to the time manager from the last one of the time elements in the series thereof.

* * * * *